United States Patent
Namba

(10) Patent No.: US 9,268,294 B2
(45) Date of Patent: Feb. 23, 2016

(54) OPENING/CLOSING APPARATUS AND IMAGE RECORDING APPARATUS

(71) Applicant: BROTHER KOGYO KABUSHIKI KAISHA, Nagoya-shi, Aichi-ken (JP)

(72) Inventor: Mamoru Namba, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/501,670

(22) Filed: Sep. 30, 2014

(65) Prior Publication Data

US 2015/0160601 A1 Jun. 11, 2015

(30) Foreign Application Priority Data

Dec. 6, 2013 (JP) .................................. 2013-253684

(51) Int. Cl.

| G03G 21/16 | (2006.01) |
|---|---|
| E05D 11/10 | (2006.01) |
| H04N 1/00 | (2006.01) |
| G03G 15/00 | (2006.01) |
| E05D 3/12 | (2006.01) |
| E05D 3/18 | (2006.01) |

(52) U.S. Cl.
CPC ............ *G03G 21/1633* (2013.01); *E05D 11/10* (2013.01); *H04N 1/00* (2013.01); *E05D 3/122* (2013.01); *E05D 3/18* (2013.01); *E05Y 2900/608* (2013.01); *G03G 15/602* (2013.01); *Y10T 16/541* (2015.01)

(58) Field of Classification Search
CPC .......... G03G 21/1604; G03G 21/1619; G03G 21/1623; G03G 21/1628; G03G 21/1633; G03G 2221/1687; E05D 11/10
USPC .......................................... 399/107, 124, 125
See application file for complete search history.

(56) References Cited

U.S. PATENT DOCUMENTS 7,751,751 B2 * 7/2010 Ohta et al. .................... 399/125

FOREIGN PATENT DOCUMENTS

| JP | H06350266 A | 12/1994 |
|---|---|---|
| JP | 2007279274 A | 10/2007 |
| JP | 2007306155 A | 11/2007 |

* cited by examiner

*Primary Examiner* — Erika J Villaluna
(74) *Attorney, Agent, or Firm* — Merchant & Gould PC

(57) ABSTRACT

An opening/closing apparatus includes: an apparatus body; a pivot body pivotable between a close position covering an upper portion of the apparatus body and an open position releasing the upper portion of the apparatus body; a rack member provided on the pivot body and having a rack gear extending in a radial direction from a pivot base end portion to a pivot front-end portion of the pivot body; and an arm body having one end portion connected to the apparatus body and the other end portion connected to the rack member and slidably movable relative to the rack member. The arm body includes: a housing; a rotary damper supported by the housing and having a damping gear receiving damping force from viscous fluid; and a gear section supported by the housing and transmitting the damping force of the damping gear to the rack gear.

10 Claims, 11 Drawing Sheets

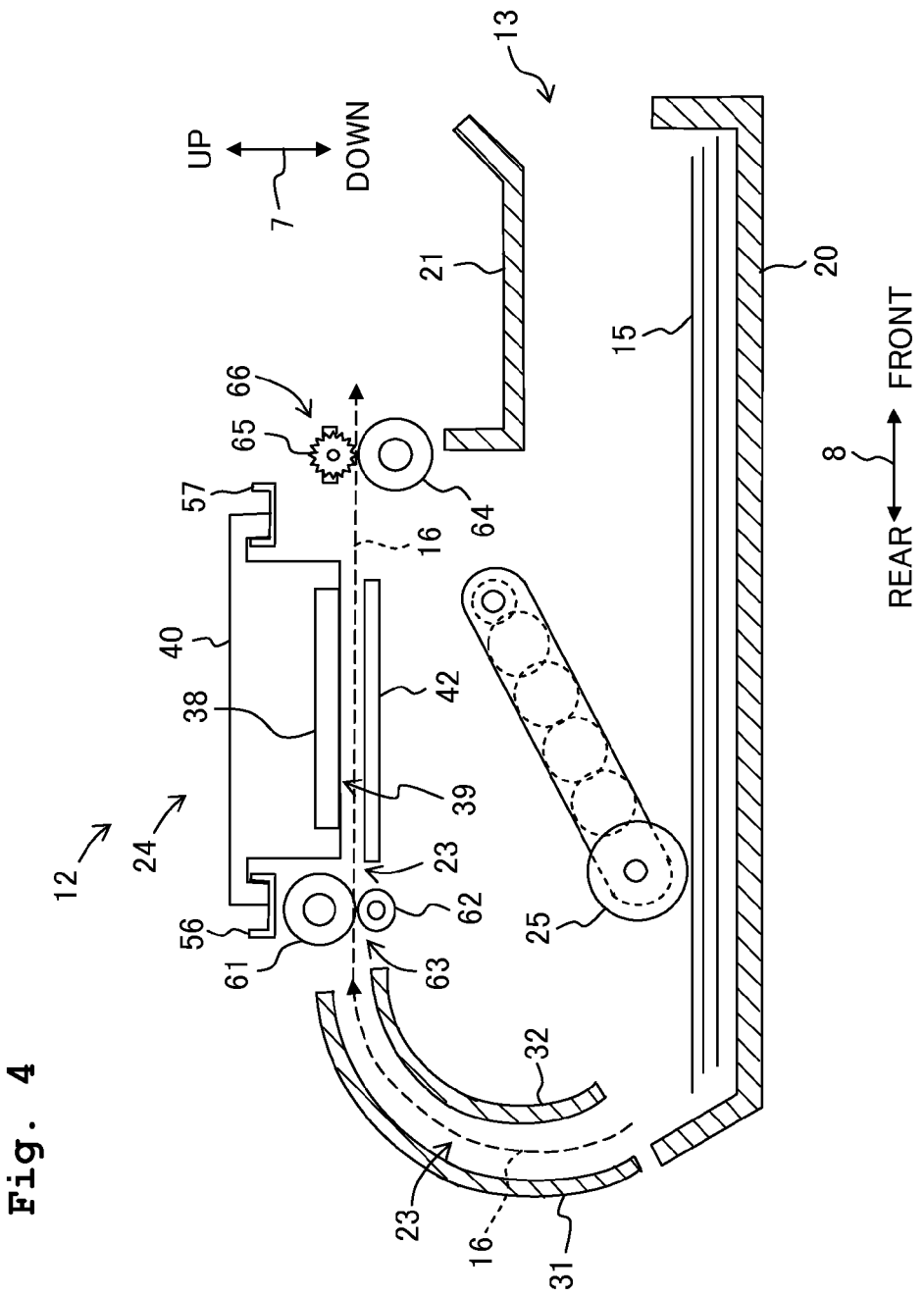

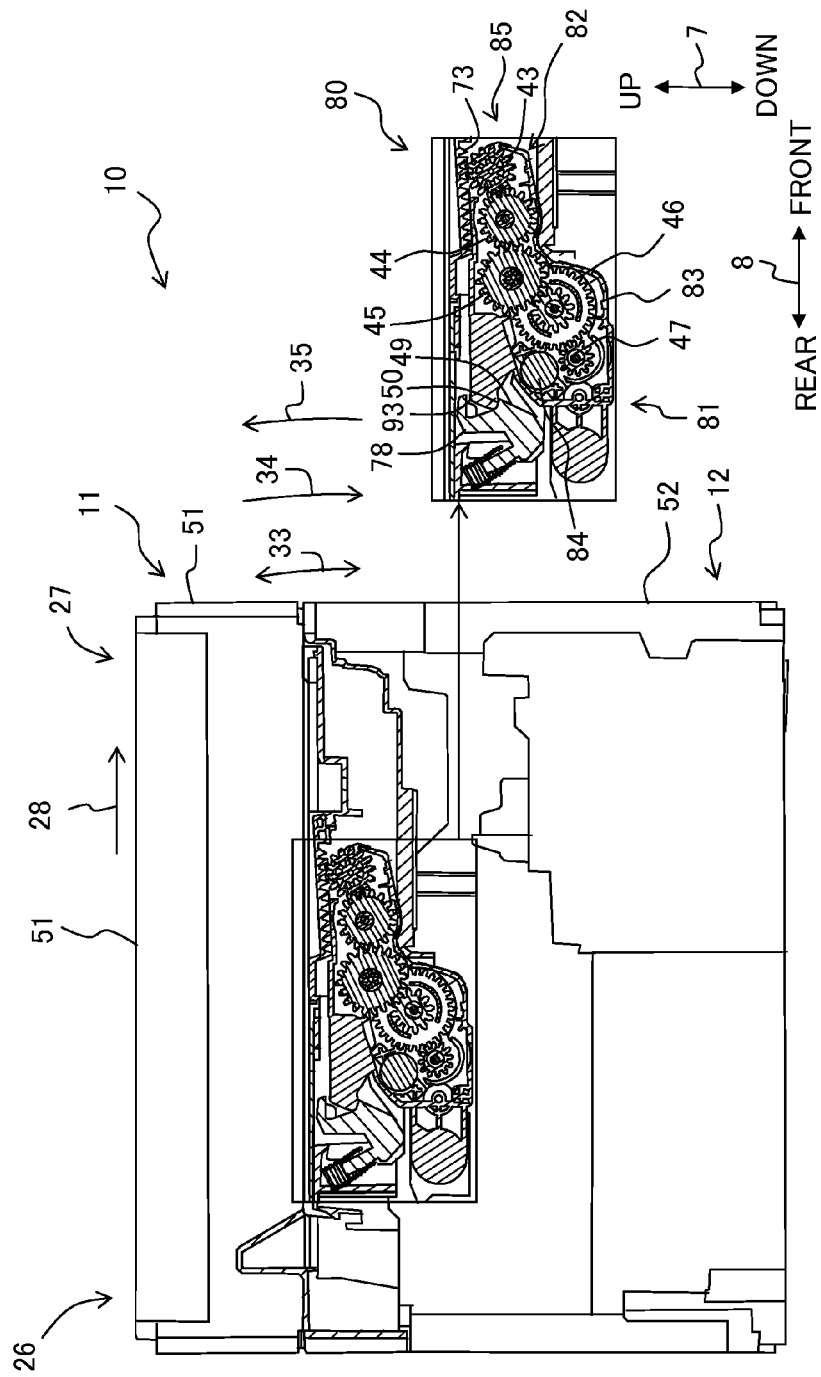

OPENING/CLOSING APPARATUS AND IMAGE RECORDING APPARATUS

CROSS REFERENCE TO RELATED APPLICATION

The present application claims priority from Japanese Patent Application No. 2013-253684 filed on Dec. 6, 2013 the disclosure of which is incorporated herein by reference in its entirety.

BACKGROUND

1. Field of the Invention

The present invention relates to an opening/closing apparatus including a body of the apparatus (apparatus body) and a pivot body which is connected to and pivotable relative to the apparatus body, and an image recording apparatus provided with the opening/closing apparatus.

2. Description of the Related Art

Conventionally, there is known an opening/closing apparatus including an apparatus body and a pivot body which is connected to and pivotable relative to the apparatus body. An apparatus provided with such an opening/closing apparatus is exemplified by an image recording apparatus configured to record an image, etc. on a recording medium such as recording sheet. In the image recording apparatus, the pivot body is supported by the apparatus body of the image recording apparatus, at an upper portion of the apparatus body. For example, in such a case that the recording sheet is jammed inside the apparatus, a user or repair service person causes the pivot body to pivot in a direction exposing (opening) the upper portion of the apparatus body so that the recording sheet jammed inside the apparatus body can be removed.

In the image recording apparatus as described above, in a case that the pivot body is made to pivot in a direction that the pivot body closes the upper portion of the apparatus body (closing direction) when a hand, etc. of the user or repair service person is located between the apparatus body and the pivot body, there is a fear that the user or repair service person might have his or her hand, etc. pinched between the pivot body and the apparatus body and consequently be injured. In order to solve such a problem, there is known an image recording apparatus including a rotary oil damper provided for the apparatus body. In the image recording apparatus including the rotary oil damper provided for the apparatus body, when the pivot body is made to pivot in the closing direction relative to the apparatus body, the pivot body receives the load from the oil damper. Consequently, the pivot body is made to slowly pivot, thereby lowering the possibility that the hand, etc. of the user or repair service person is pinched between the pivot body and the apparatus body. Even in such a case that the user or repair service person has his or her hand, etc. pinched between the pivot body and the apparatus body, the damage to the hand, etc. is not severe, and the possibility that the user or repair service person might receive any injury on his or her hand, etc. is lowered.

SUMMARY

In the image recording apparatus including the rotary oil damper provided for the apparatus body, however, any sect gear, sun gear, etc. to be engaged with the oil damper disposed inside the apparatus body are provided for the pivot body. As a result, any space needs to be provided inside the apparatus body for accompanying these sect gear, sun gear, etc. when the pivot body is closed relative to the apparatus body. Namely, the apparatus body of the image recording apparatus is required to have both of the space for accompanying the oil damper and the space for accompanying the sect gear, sun gear, etc. Consequently, the image recording apparatus becomes large-sized.

The present invention is made in view of the above-described problem, and an object of the present invention is to provide an opening/closing apparatus provided with a rotary damper configured to impart the load to the pivot motion of the pivot body while preventing the apparatus from becoming large-sized, and an image recording apparatus provided with the closing/opening apparatus.

According to a first aspect of the present teaching, there is provided an opening/closing apparatus including: an apparatus body; a pivot body provided with a pivot base end portion including a pivot center around which the pivot body pivots relative to the apparatus body, and a pivot front-end portion of which pivot motion amount is greatest in a case that the pivot body pivots relative to the apparatus body, the pivot body being pivotable relative to the apparatus body between a close position at which an upper portion of the apparatus body is covered by the pivot body and an open position at which the upper portion of the apparatus body is released; a rack member provided on the pivot body and having a rack gear extending in a radial direction from the pivot base end portion to the pivot front-end portion; and an arm body having one end portion connected to the apparatus body and the other end portion connected to the rack member and configured to slide relative to the rack member, wherein the arm body includes: a housing; a rotary damper supported by the housing and having a damping gear configured to receive damping force from viscous fluid; and a gear section supported by the housing and configured to transmit the damping force of the damping gear to the rack gear.

According to the configuration of the opening/closing apparatus according to the first aspect of the present teaching, the gear section and the rotary damper are accommodated in the arm body, and thus the accommodating space for the gear section and the rotary damper in the apparatus body and the accommodation space for the arm body in the apparatus body can be made common.

According to a second aspect of the present teaching, there is provided an image recording apparatus including: the opening/closing apparatus according to the first aspect; and a recording unit provided for the apparatus body and configured to record an image on a recording medium.

BRIEF DESCRIPTION OF THE DRAWINGS

FIGS. 1A and 1B are perspective views of the outer appearance of a multifunction peripheral, wherein FIG. 1A depicts a state that a scanner housing is located at a close position, and FIG. 1B depicts a state that the scanner housing is located at an open position.

FIGS. 2A and 2B are front views of the multifunction peripheral, wherein FIG. 2A depicts the state that the scanner housing is located at the close position, and FIG. 2B depicts the state that the scanner housing is located at the open position.

FIGS. 3A and 3B are left side views of the multifunction peripheral, wherein FIG. 3A depicts the state that the scanner housing is located at the close position, and FIG. 3B depicts the state that the scanner housing is located at the open position.

FIG. 4 is a vertical cross-sectional view schematically depicting the internal structure of a printer section.

FIGS. 5A to 5C are views depicting a rack member and an arm body in the state that the scanner housing is located at the close position, wherein FIG. 5A is a left side view, FIG. 5B is a front view, and FIG. 5C is a cross-sectional view taken along a line VC-VC in FIG. 5B.

FIGS. 7A to 7C are views depicting the rack member and the arm body in a state that the scanner housing starts a pivot motion from the open position to the close position, wherein FIG. 7A is a front view, FIG. 7B is a cross-sectional view taken along a line VIIB-VIIB in FIG. 7A, and FIG. 7C is a cross-sectional view taken along a line VIIC-VIIC in FIG. 7A.

FIGS. 8A to 8C are views depicting the rack member and the arm body in a state that the scanner housing has completed a pivot motion from the close position to the open position, wherein FIG. 8A is a front view, FIG. 8B is a cross-sectional view taken along a line VIIIB-VIIIB in FIG. 8A, and FIG. 8C is a cross-sectional view taken along a line VIIIC-VIIIC in FIG. 8A.

FIG. 11 is a cross-sectional view corresponding to FIG. 9 in the state that the scanner housing is located at the close position.

DESCRIPTION OF THE EMBODIMENTS

Figure 1A:
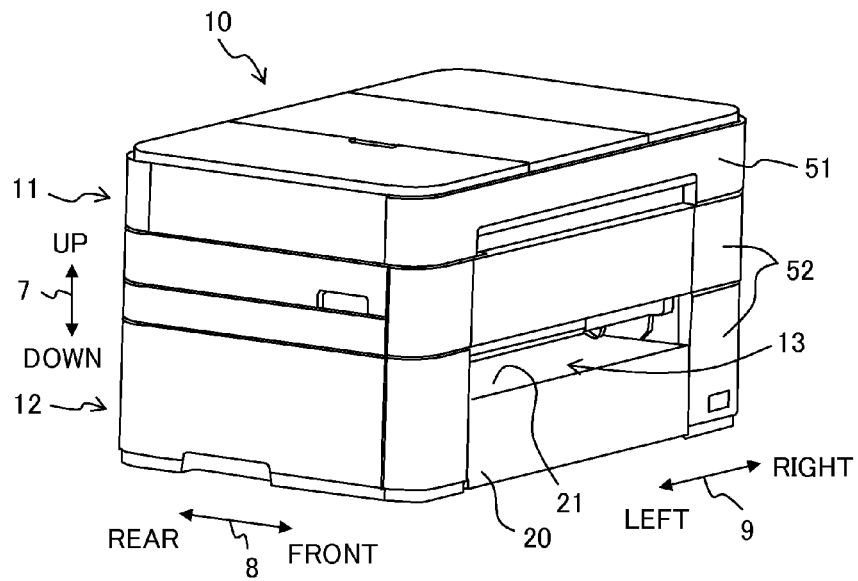

In the following, an embodiment of the present teaching will be described. Note that the embodiment to be described below is merely an example of the present teaching. It goes without saying that the embodiment of the present teaching can be changed or modified as appropriate, within a range not changing the gist or spirit of the present teaching. Note that in the following description, an up-down direction 7 is defined, with reference to a state in which a multifunction peripheral 10 is operably placed (the state depicted in FIG. 1), a front-rear direction 8 is defined with reference to that a portion of the multifunction peripheral 10 on which an opening 13 is provided is a near side (front side), and a left-right direction 9 is defined with reference to a view from a view point in front of the multifunction peripheral 10.

<Overall Configuration of Multifunction Peripheral 10>

As depicted in FIG. 1, the multifunction peripheral 10 as an example of the image recording apparatus according to the present teaching has a shape that is substantially of rectangular parallelepiped. The multifunction peripheral 10 is provided with a scanner unit 11 disposed on an upper portion of the multifunction peripheral 10 and configured to read an image recorded on an original such as a recording sheet with an image sensor (not depicted in the drawings) and to obtain an image data of the read image. The multifunction peripheral 10 is further provided with a printer unit 12 disposed below the scanner unit 11 and configured to record an image, etc. on a recording sheet 15 (an example of the recording medium according to the present teaching; see FIG. 4) accommodated in a feed tray 20.

As depicted in FIGS. 1 to 3, the scanner unit 11 has a scanner housing 51 (an example of the pivot body according to the present teaching) having a shape that is substantially of rectangular parallelepiped. Further, the printer section 12 has a shape that is substantially of rectangular parallelepiped, and includes a printer housing 52 (an example of the apparatus body according to the present teaching) which has an opening 13 formed on the front surface thereof.

A platen glass (not depicted in the drawing) configured to support an original, the image sensor configured to read the original supported by the platen glass, etc. are arranged inside the scanner housing 51.

A feed tray 20, a pair of conveyance rollers 63, a pair of discharging rollers 66, a recording unit 24, etc. depicted in FIG. 4 are arranged inside the printer housing 52 depicted in FIGS. 1 to 3. The feed tray 20 can be inserted to and pulled out from the printer housing 52, via the opening 13, in the front-rear direction 8. The feed tray 20 accommodates and supports the recording sheet 15. The pair of conveyance rollers 63 and the pair of discharging rollers 66 convey the recording sheet 15 supported by the feed tray 20 along a conveyance path 23. The recording unit 24 records an image on the recording sheet 15, conveyed along the conveyance path 23, for example based on an image data read from the original by the scanner unit 11, etc.

The recording sheet 15, having the image recorded thereon, is conveyed toward a discharge tray 21, then is discharged by the pair of discharging rollers 66, and is supported on the discharge tray 21. Here, the discharge tray 21 in the multifunction peripheral 10 is supported by the feed tray 20, and can be inserted to and pulled out from the printer housing 52, via the opening 13, together with the feed tray 20.

A feeding roller 25 is arranged above the feed tray 20. The feeding roller 25 is rotated by a driving force transmitted thereto from a feeding motor (not depicted in the drawings). The feed roller 25 to which the driving force is transmitted feeds the recording sheet 15 supported by the feed tray 20 toward the conveyance path 23.

The conveyance path 23 is a passage extending upward from a rear end portion of the feed tray 20, then making a U-turn, and extending frontward to arrive at the discharge tray 21. A portion of the conveyance path 23 is defined by first and second guide members 31, 32 facing each other with a predetermined spacing distance and by the recording unit 24 and a platen 42 facing each other with a predetermined spacing distance. The recording sheet 15 is conveyed along the conveyance path 23 in a conveyance direction 16 that is a direction indicated in FIG. 4 with dashed-line arrows.

The pair of conveyance rollers 63 constructed of a conveyance roller 61 and a pinching roller 62 is arranged upstream of the recording unit 24 in the conveyance direction 16. The pinching roller 62 is brought into pressurized contact against a roller surface of the conveyance roller 61 by an elastic member such as a spring (not depicted in the drawings). The pair of discharging rollers 66 constructed of a discharging roller 64 and a spur roller 65 is arranged downstream of the recording unit 24 in the conveyance direction 16. The spur roller 65 is brought into pressurized contact against a roller surface of the discharging roller 64 by an elastic member such as a spring (not depicted in the drawings).

The conveyance roller 61 and the discharging roller 64 are rotated by a driving force transmitted thereto from a conveyance motor (not depicted in the drawings). The conveyance roller 61 and the discharging roller 64, to which the driving force is transmitted, convey the recording sheet 15 in the conveyance direction 16 while pinching the recording sheet 15 respectively between the pinching roller 62 and the spur roller 65.

The recording unit 24 is disposed between the pair of conveyance rollers 63 and the pair of discharging rollers 66. A platen 42 is disposed at a position below the recording unit 24 and facing the recording unit 24. The platen 42 is capable of supporting the recording sheet 15 conveyed along the conveyance path 23. The recording unit 24 is provided with a carriage 40 and a recording head 38. The carriage 40 is supported to be reciprocated in the left-right direction 9 by two guide rails 56 and 57 arranged in the front-rear direction 8 with a spacing distance therebetween. The recording head 38 is installed in the carriage 40. An ink is supplied to the recording head 38 from an ink cartridge (not depicted in the drawings). Nozzles 39 are formed in a lower surface of the recording head 38. When the carriage 40 is moved (reciprocated) in the left-right direction 9, the recording head 38 discharges ink droplets from the nozzles 39 toward the platen 42. With this, an image is recorded on the recording sheet 15 transported in the conveyance direction 16 and supported by the platen 42.

Note that in the embodiment, although the system by which the recording unit 24 records the image on the recording sheet 15 is the ink-jet recording system of serial type, it is also allowable to adopt the ink-jet recording system of line-head type, or to adopt the electrophotography system, the thermal head system, etc.

<Overall Configuration of Opening/Closing Apparatus>

The multifunction peripheral 10 is provided with the closing/opening apparatus according to the present teaching. The opening/closing apparatus is provided with the scanner housing 51 and the printer housing 52 as described above and a rack member 70 and an arm body 80 which will be described later on.

As depicted in FIG. 3, a projection 53 extending in the left/right direction 9 is formed in the printer housing 52 at an rear upper portion thereof. The projection 53 is inserted in a hole (not depicted in the drawings) formed in a projection 54 which is provided on the scanner housing 51 at a rear portion 26 thereof (an example of the pivot base end portion of the present teaching) so that the projection 54 projects downward from the rear portion 26. With this, the scanner housing 51 is pivotable relative to the printer housing 52, with the projection 53 as the center of the pivot motion.

Namely, the rear portion 26 of the scanner housing 51 includes the pivot center when the scanner housing 51 makes the pivot motion (pivots) relative to the printer housing 52. Note that the configuration for allowing the scanner housing 51 to be pivotable relative to the printer housing 52 is not limited to the above configuration. For example, it is allowable that the scanner housing 51 is configured to be pivotable relative to the printer housing 52 by connecting the scanner housing 51 with the printer housing 52 via a hinge.

Figure 1B:
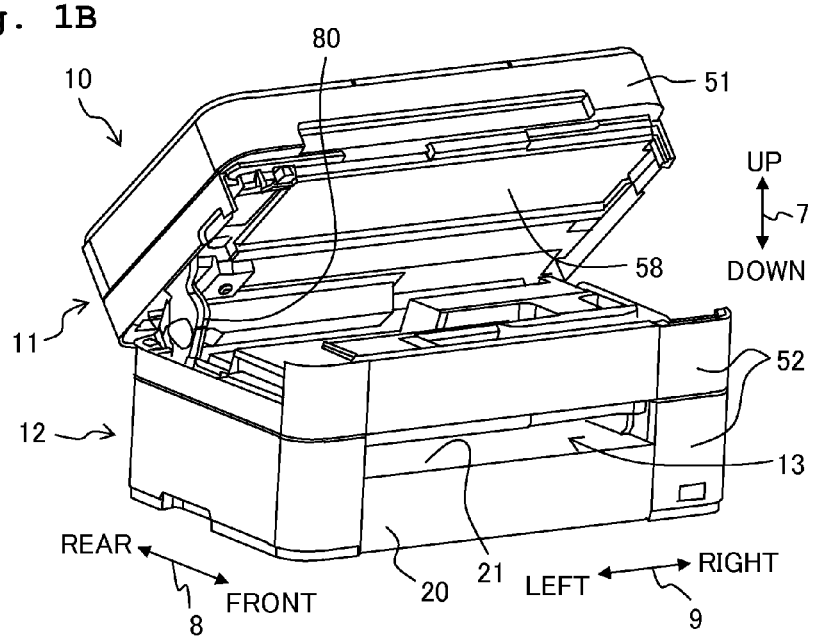
Figure 2A:
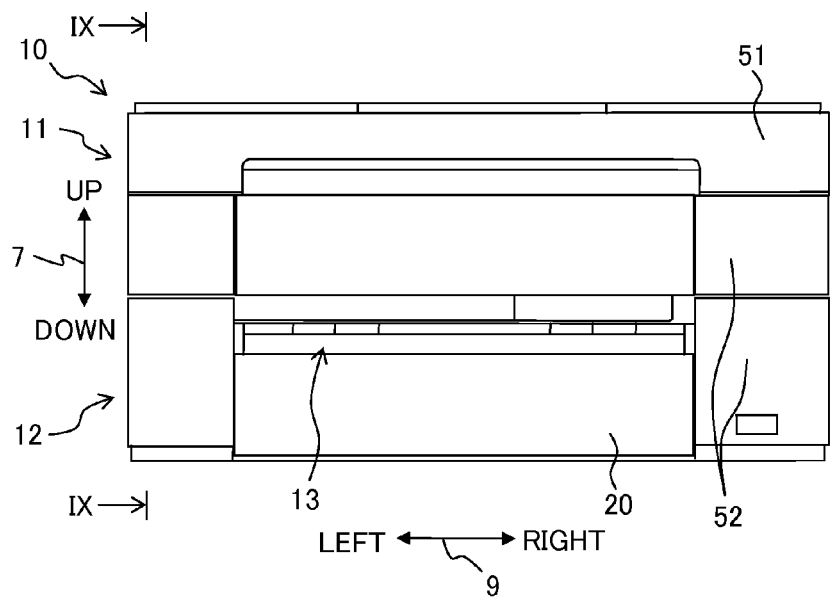
Figure 2B:
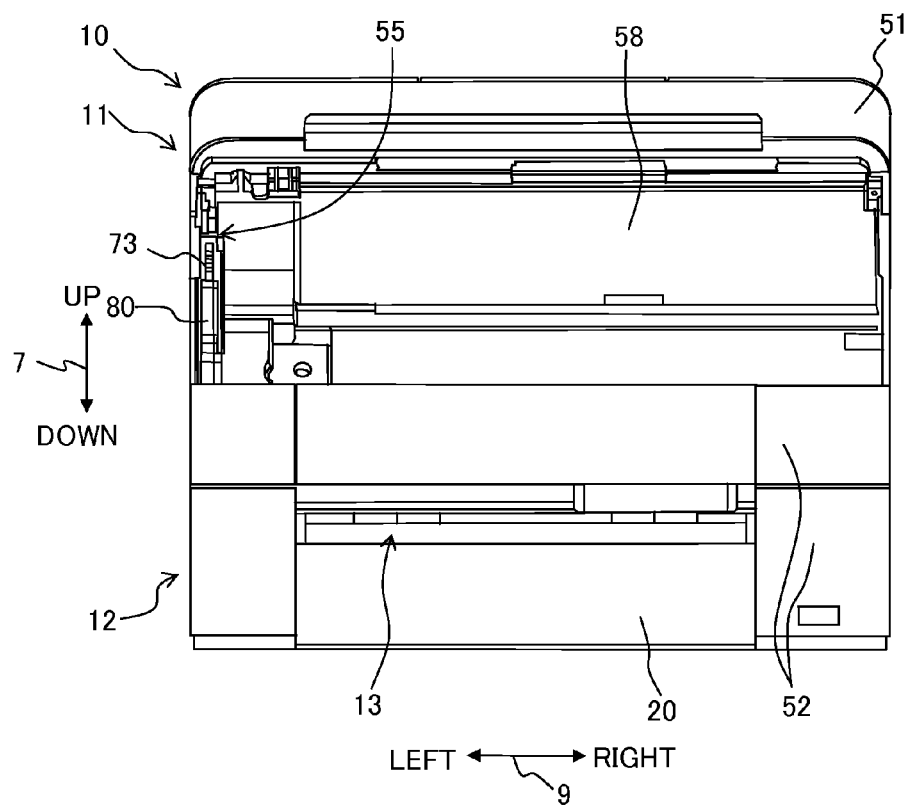
Figure 3A:
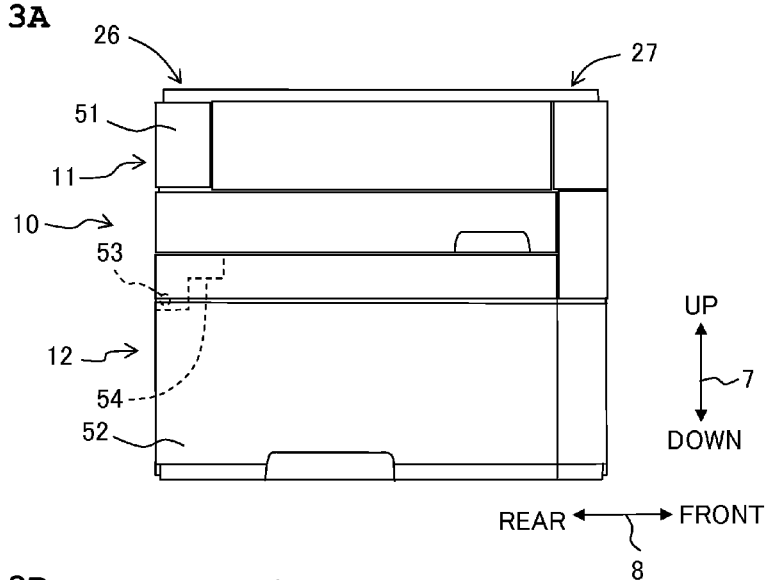
Figure 3B:
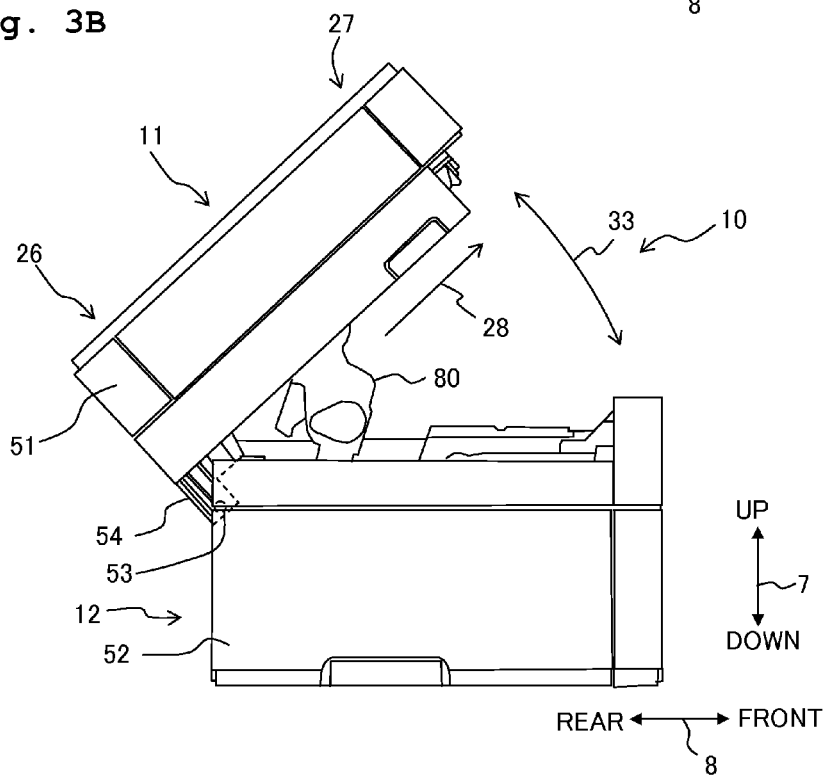

As depicted in FIGS. 1 to 3, the scanner housing 51 is pivotable in a direction indicated by an arrow 33 (see FIG. 3B). With this, the scanner housing 51 pivots relative to the printer housing 52 between a close position (position indicated in FIGS. 1A, 2A and 3A) at which the scanner housing 51 covers an upper portion of the printer housing 52 and an open position (position indicated in FIGS. 1B, 2B and 3B) at which the scanner housing 51 opens (exposes, releases) the upper portion of the printer housing 52. In this situation, the amount of pivot motion of a front portion 27 of the scanner housing 51 is greater than that of any other portions in the scanner housing 51.

As depicted in FIG. 2B, a recessed portion 55 is formed in the scanner housing 51 at a left end portion of a lower surface 58 thereof. The recessed portion 55 extends along a radial direction 28 extending from the rear end portion 26 to the front end portion 27 of the scanner housing 51 (see FIG. 3B).

<Rack Member 70>

Figure 5A:
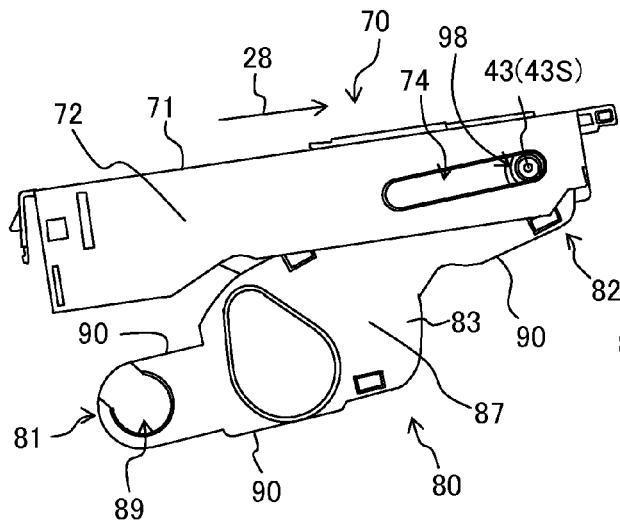
Figure 5B:
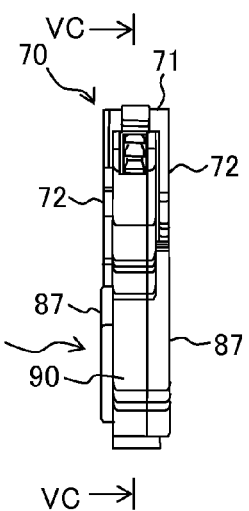

The rack member 70 is fixed to the scanner housing 51 in a state that the rack member 70 is fitted in the recessed portion 55. As depicted in FIGS. 5A and 5B, the rack member 70 is provided with an upper plate 71 of which longitudinal direction is the radial direction 28 and a pair of side plates 72 extending downward from the both end portions in the short direction of the upper plate 71.

Figure 5C:
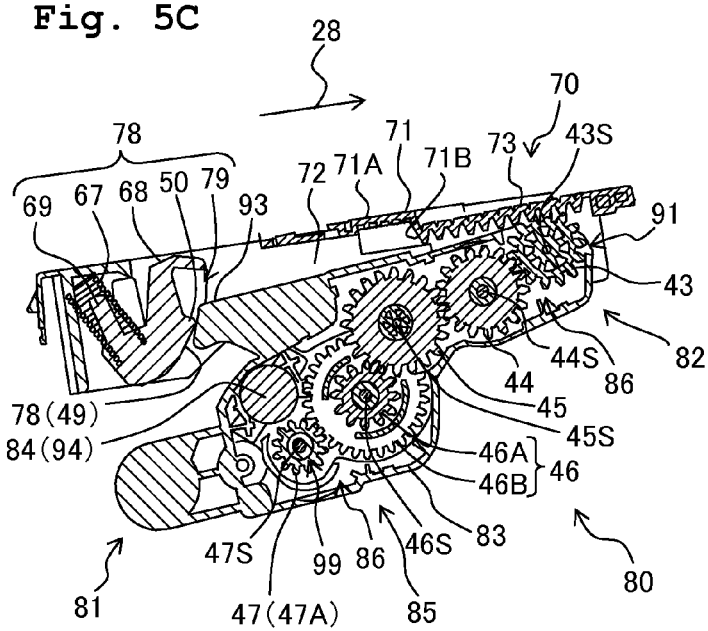
Figure 7:
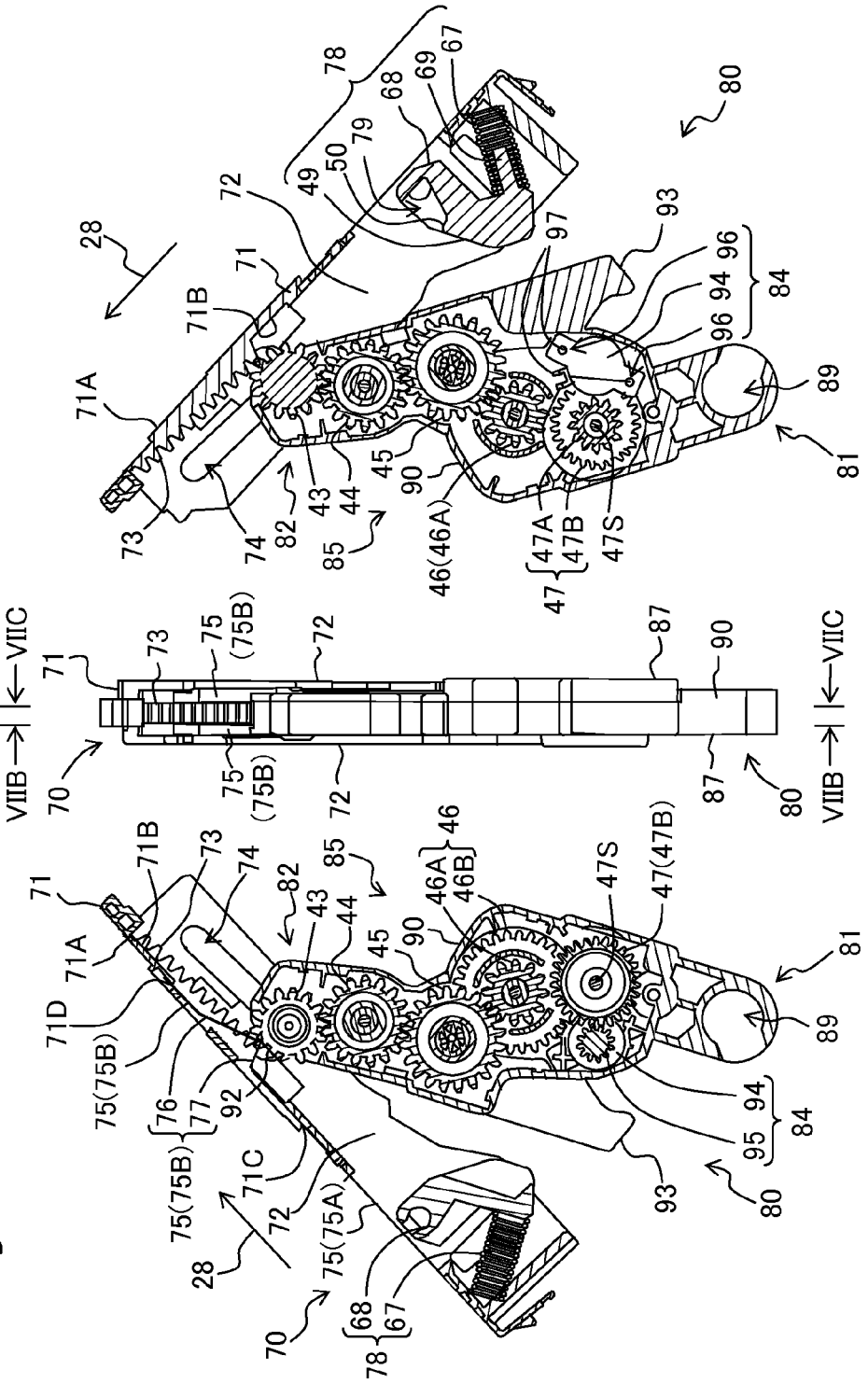

As depicted in FIG. 5C, a rack gear 73 extending in the longitudinal direction of the upper plate 71 is provided on an inner surface 71B of the upper plate 71. As depicted in FIG. 7A, the rack gear 73 is arranged in the central portion in the short direction of the upper plate 71. Further, as depicted in FIG. 5A, an elongated hole 74 elongated in a direction parallel to the extending direction of the rack gear 73 is provided on each of the pair of side plates 72. In the following description, a side of the rack member 70 on which the rack gear 73 and the elongated hole 74 are provided (the downstream side in the radial direction 28) is referred to as "one end side". Further, a side of the rack member 70 opposite to the one end side (the upstream side in the radial direction 28) is referred to as "other end side".

When the rack member 70 is fitted in the recessed portion 55, an outer surface 71A in the upper plate 71 of the rack member 70 is brought into contact with and fixed to the bottom surface of the recessed portion 55. Namely, the rack gear 73 provided on the inner surface 71B of the rack member 70 is fixed to the inside of the recessed portion 55. Further, in a state that the rack member 70 is fixed in the recessed portion 55, the rack gear 73 is in the extending state along the radial direction 28. In this situation, the rack member 70 is fitted in the recessed portion 55 such that the one end side of the rack member 70 is the front side of the multifunction peripheral 10.

As depicted in FIG. 7B, a leaf spring 75 (an example of the open-engaged portion of the present teaching) is attached to the upper plate 71 of the rack member 70. The leaf spring 75 has a substantially tuning-fork like shape, and is provided with a based end portion 75A and two arm portions 75B extending from the base end portion 75A. As depicted in FIG. 7A, the two arm portions 75B of the leaf spring 75 are provided on the inner surface 71B, of the upper plate 71, at the both end portions in the short direction of the upper plate 71. Namely, the two arm portions 75B of the leaf spring 75 are arranged so as to sandwich the rack gear 73 therebetween.

As depicted in FIG. 7B, the leaf spring 75 extends along the longitudinal direction of the upper plate 71, namely along the radial direction 28. The most portions of the leaf spring 75 are brought into contact with the outer surface 71A of the upper plate 71. Namely, the most portions of the base end portion 75A and a portion, of each of the two arm portions 75B, different from first and second inclined portions 76 and 77 (to be described later on) are brought into contact with the outer surface 71A. Then, the remaining portions, of the leaf spring 75, that are not brought into contact with the outer surface 71A enter into the inside of the rack member 70 (a space defined between the pair of side plates 72) from openings 71C and 71D provided on the upper plate 71 of the rack member 70. In the leaf spring 75, each of the two arm portions 75B entering into the inside of the rack member 70 is provided with, at a position overlapping with the rack gear 73 in the radial direction 28, a first inclined portion 76 inclined in a direction separating away from the inner surface 71B of the upper plate 71 and a second inclined portion 77 continued from the first inclined portion 76 and inclined from a boundary position with respect to the first inclined portion 76 toward the inner surface 71B of the upper plate 71. The first inclined portion 76 and the second inclined portion 77 of each of the two arm portions 75B are elastically deformable in a case that the first and second inclined portions 76 and 77 are pushed (pressed) toward the upper plate 71. The inclination angle defined between the first inclined portion 76 and the upper plate 71 is smaller than the inclination angle defined between the second inclined portion 77 and the upper plate 71. Namely, the first inclined portion 76 is inclined with respect to the upper plate 71 to an extent smaller than the second inclined portion 77. The second inclined portion 77 is engaged with a projection 92 provided on an arm body 80 (to be described later on) in a state that the scanner housing 51 is located at the open position.

As depicted in FIG. 5C, an actuator mechanism 78 (an example of close-engaged portion of the present teaching) is attached to the rack member 70. The actuator mechanism 78 is provided with a coil spring 67 attached to the other end side of the rack member 70 (the side opposite to the one end side at which the rack gear 73 is provided) and a contact member 68 connected to the coil spring 67.

One end of the coil spring 67 is fixedly attached to the upper plate 71. A projection 69 provided on the contact piece 68 is inserted in the other end of the coil spring 67. A recessed portion 79 is provided in the contact member 68 at a position on the side opposite to the projection 69. With the configuration as described above, the actuator mechanism 78 is displaceable as the coil spring 67 expands and contracts. Further, in a state that the scanner housing 51 is located at the close position, the actuator mechanism 78 is engaged with a projection 93 provided on the arm body 80 (to be described later on) by allowing the projection 93 to be inserted in the recessed portion 79.

<Overall Configuration of Arm Body 80>

Figure 9:
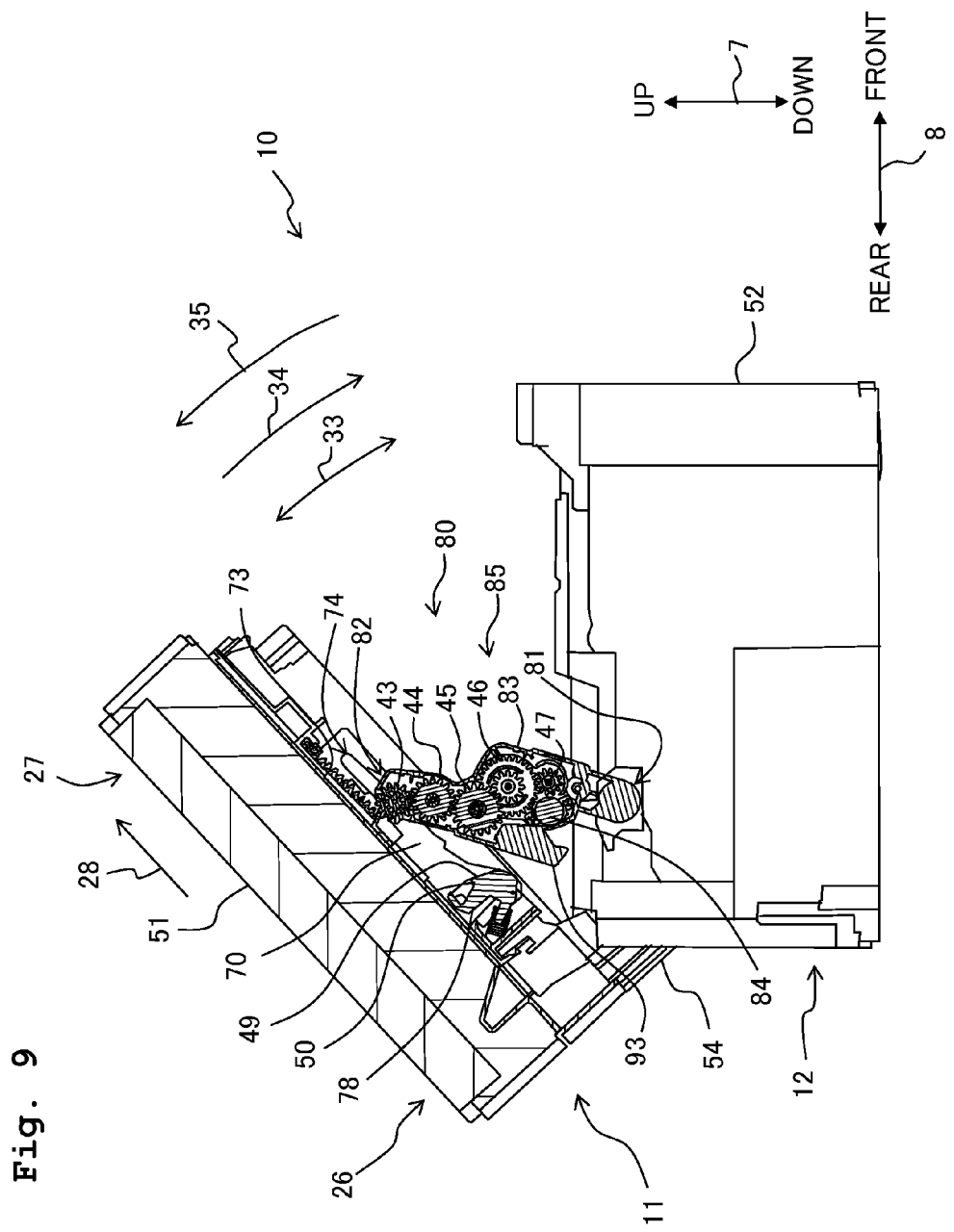
FIG. 9 is a cross-sectional view taken along a line IX-IX in FIG. 2A in the state that the scanner housing is located at the open position.

As depicted in FIG. 9, one end portion 81 of the arm body 80 is connected to the printer housing 52. Further, the other end portion 82 of the arm body 80 is connected to the rack member 70 fitted into the recessed portion 55 of the scanner housing 51. As depicted in FIG. 5C, the arm body 80 is provided with a housing 83, and a rotary damper 84 and a gear section 85 which are supported by the housing 83.

<Housing 83>

As depicted in FIG. 5C, the housing 83 is a member constructing the contour of the arm body 80 and has an inner space 86 defined therein. The housing 83 is formed, for example, by combining two members having recessed portions on one side thereof together in a state that the recessed portions are made to face each other. At this time, the inner space 86 is defined by the two recessed portions facing each other.

As depicted in FIGS. 5A and 5B, the housing 83 is provided with a pair of parallel plates 87 parallel to the side plates 72 of the rack member 70 and a side plate 90 connecting the pair of parallel plates 87.

As depicted in FIG. 5A, a recessed portion 89 is provided on one end portion 81 on the outer surface of one of the pair of parallel plates 87. Further, a projection (not depicted in the drawings) provided in the printer housing 52 at a rear upper end portion thereof is inserted into the recessed portion 89. With this, the arm body 80 is connected to the printer housing 52 to be pivotable with the one end portion 81 as the center of the pivot motion.

The other end portion 82 of the parallel plates 87 of the housing 83 is inserted between the pair of side plates 72 of the rack member 70. Further, the other end portion 82 of the arm body 80 slidably moves relative to the rack member 70 under a condition that a gear shaft 43S of a gear 43 (to be described later on) slides inside the elongated hole 74 provided on the rack member 70.

As depicted in FIG. 5C, an opening 91 is provided on a side of the other end portion 82 in the side plate 90 of the housing 83. The inner space 86 of the arm body 80 is communicated with the outside of the arm body 80 via the opening 91.

As depicted in FIG. 7B, a projection 92 (an example of the open-engaging portion of the present teaching) is provided on a side of the other end portion 82 in the side plate 90 of the housing 83. The projection 92 is arranged at a position facing the upper plate 71 of the rack member 70. The projection 92 is engaged with the second inclined portion 77 of the leaf spring 75 in a case that the scanner housing 51 is located at the open position.

As depicted in FIGS. 7B and 7C, a projection 93 (an example of the close-engaging portion of the present teaching) is provided between the one end portion 81 and the other end portion 82 in the side plate 90 of the housing 83. The projection 93 is arranged at a position facing the actuator mechanism 78. The projection 93 is engaged with the recessed portion 79 of the contact member 68 of the actuator mechanism 78 in a case that the scanner housing 51 is located at the close position.

<Rotary Damper 84>

As depicted in FIGS. 7B and 7C, the rotary damper 84 is arranged in the inner space 86 of the housing 83. The rotary damper 84 is provided with a housing 94, a shaft body (not depicted in the drawings) which is arranged to be rotatable inside the housing 94 and which projects to the outside of the housing 94, a rotor (not depicted in the drawings) which is attached to the shaft body in the housing 94 and is configured to pivot by the rotation of the shaft body, and a damper gear 95 which is attached to the shaft body at the outside of the housing 94 and which is configured to rotate with the shaft body as the rotational center. Viscous fluid is filled inside the housing 94. The viscous fluid is, for example, fluid composed of a liquid such as silicone oil, and a variety of kinds of fixed particles, magnetic particles, etc. dispersed in the liquid, or a fluid to which an inorganic additive is added.

The housing 94 is formed with attachment holes 96. Screws 97, etc. are inserted in the attachment holes 96 to thereby support the rotary damper 84 with the housing 83 of the arm body 80.

When the shaft body rotates to rotate the rotor, friction is generated between the rotor and the viscous fluid inside the housing 94. With this, the damping gear 95 attached to the shaft body receives the damping force for stopping the rotation of the shaft body.

The damping gear 95 intermeshes with a gear 47 which is included in gears 43 to 47 constructing a gear section 85 and is supported at a position nearest to the side of the one end portion 81 of the housing 83 in the arm body 80.

<Gear Section 85>

The gear section 85 depicted in FIG. 5C is configured to transmit the damping force received by the damping gear 95 of the rotary damper 84 (see FIG. 7B) to the rack gear 73. The gear section 85 is a gear array constructed of five pieces of gears that are the gears 43 to 47 intermeshing with one another. The five gears 43 to 47 are arranged in the inner space 86 of the housing 83 so that the gears 43 to 47 are aligned from the other end portion 82 in a direction toward the one end portion 81.

Figure 6:
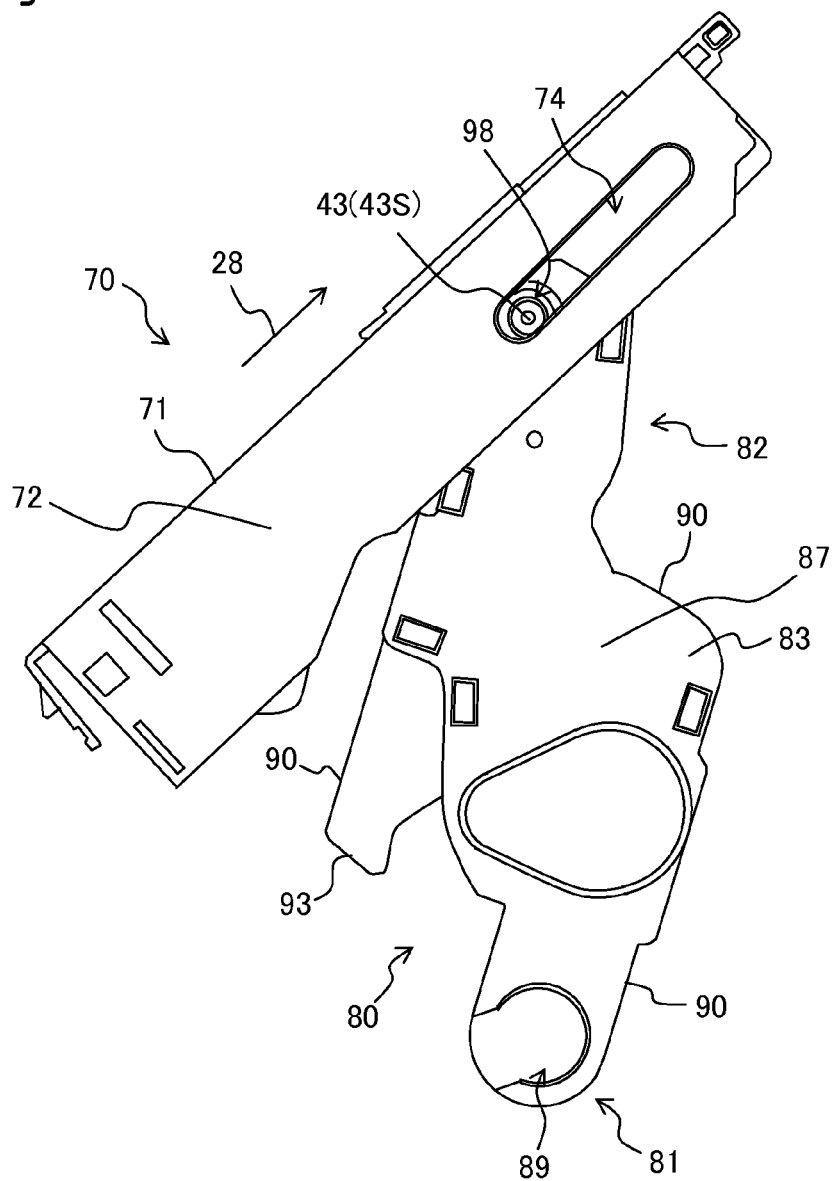
FIG. 6 is a left side view of the rack member and the arm body in the state that the scanner housing is located at the open position.

As depicted in FIGS. 5A and 6, an opening 98 is formed in the other end portion 82 of the pair of parallel plates 87 in the housing 83. A gear shaft 43S (an example of the rotary shaft of the sliding gear of the present teaching), protruded from the gear 43 (an example of the sliding gear of the present teaching), is allowed to protrude to the outside of the housing 83 via the opening 98. With this, the gear 43 is supported by the housing 83 of the arm body 80 to be rotatable, with the gear shaft 43S as the rotational center. Further, the gear shaft 43S of the gear 43 protruding to the outside of the housing 83 is inserted to the elongated hole 74 provided on the rack member 70. With this, the gear shaft 43S of the gear 43 slidably moves in the elongated hole 74 under a condition that the scanner housing 51 pivots in the direction of the arrow 33 (see FIG. 3B).

Three recessed portions (not depicted in the drawings) are formed on the inner surface of each of the pair of parallel plates 87 in the housing 83. Gear shafts 44S, 45S and 46S protruding from the respective gears 44, 45 and 46 are inserted to the three recesses on each of the parallel plates, respectively. With this, the gears 44, 45 and 46 are supported by the housing 83 of the arm body 80 so that the gears 44, 45 and 46 are rotatable with the gear shafts 44S, 45S and 46S as the centers of rotation, respectively.

As depicted in FIG. 5C, grooves 99 are formed at portions each located on the side of the one end portion 81 in the inner surface of one of the pair of parallel plates 87 of the housing 83. The gear shaft 47S protruding from the gear 47 is inserted in the grooves 99, thereby supporting the gear 47 with the housing 83 of the arm body 80 such that the gear 47 is rotatable about the gear shaft 47S and movable along the grooves 99.

The gear 43 is arranged nearest to the side of the other end portion 82 of the housing 83. A portion of the gear 43 protrudes from the opening 91. The portion of the gear 43 protruding from the opening 91 intermeshes with the rack gear 73.

The gear 44 is arranged in the housing 83 to be nearer to the side of the one end portion 81 than the gear 43. The gear 44 intermeshes with the gear 43. The gear 45 is arranged in the housing 83 to be nearer to the side of the one end portion 81 than the gear 44. The gear 45 intermeshes with the gear 44.

The gear 46 is arranged in the housing 83 to be nearer to the side of the one end portion 81 than the gear 45. The gear 46 is a multistage gear. The gear 46 is constructed of two gears 46A and 46B aligned in the thrust direction and configured to integrally rotate about a same gear shaft 46S. The gear 46A intermeshes with the gear 45. The gear 46B intermeshes with a gear 47A (to be described later on). The diameter of the gear 46A is smaller than the diameter of the gear 46B. The number of teeth of the gear 46A is smaller than the number of teeth of the gear 46B. With this, the tangential velocity of the gear 46B is faster than the tangential velocity of the gear 46A. Here, the torque of the gear 46A is same as the torque of the gear 46B. Further, the diameter of the gear 46B is greater than the diameter of the gear 46A. Accordingly, the force in the tangential direction of the gear 46B with respect to the gear 47A is smaller than the force in the tangential direction in such an assumed case that the gear 46A intermeshes with the gear 47A. Note that it is allowable that the gear 46 is not a multistage gear. Namely, the gear 46 may have a configuration similar to those of the gears 44 and 45.

The gear 47 (an example of the transmission switching section of the present teaching) is arranged in the housing 83 to be nearer to the side of the one end portion 81 than the gear 46. As depicted in FIG. 7C, the gear 47 is constructed of two gears 47A and 47B aligned in the thrust direction and configured to integrally rotate about a same gear shaft 47S. Namely, the gear 47 is a multistage gear, similar to the gear 46. The gear 47A intermeshes with the gear 46B. The gear 47B is intermeshable with the damping gear 95. The diameter of the gear 47A is smaller than the diameter of the gear 47B. The number of teeth of the gear 47A is smaller than the number of teeth of the gear 47B. With this, the tangential velocity of the gear 47B is faster than the tangential velocity of the gear 47A. Here, the torque of the gear 47A is same as the torque of the gear 47B. Further, the diameter of the gear 47B is greater than the diameter of the gear 47A. Accordingly, the force in the tangential direction of the gear 47B with respect to the damping gear 95 is smaller than the force in the tangential direction in such an assumed case that the gear 47A intermeshes with the damping gear 95. Note that it is allowable that the gear 47 is not a multistage gear. Namely, the gear 47 may have a configuration similar to those of the gears 44 and 45. That is, it is allowable that the gear section 85 is not provided with the multistage gear.

The gear shaft 47S of the gear 47 is movable along the grooves 99. Here, each of the grooves 99 is elongated along the circumferential direction of a circle about the gear shaft 46S of the gear 46. Further, one end portion of each of the grooves 99 is away from the rotary damper 84 than the other end portion of each of the grooves 99. Namely, the motion of the gear shaft 47S of the gear 47 along the grooves 99 causes the gear 47 to move nearer to and away from the rotary damper 84.

As depicted in FIG. 5C, the gear 47A intermeshes with the gear 46B. With this, the gear 47 rotates on the gear shaft 47S as the rotational center thereof and orbits (turns) around the gear 46 accompanying with the rotation of the gear 46, while maintaining the intermeshing with the gear 46. Namely, the gear 47 is a planet gear of which sun gear is the gear 46.

Figure 8:
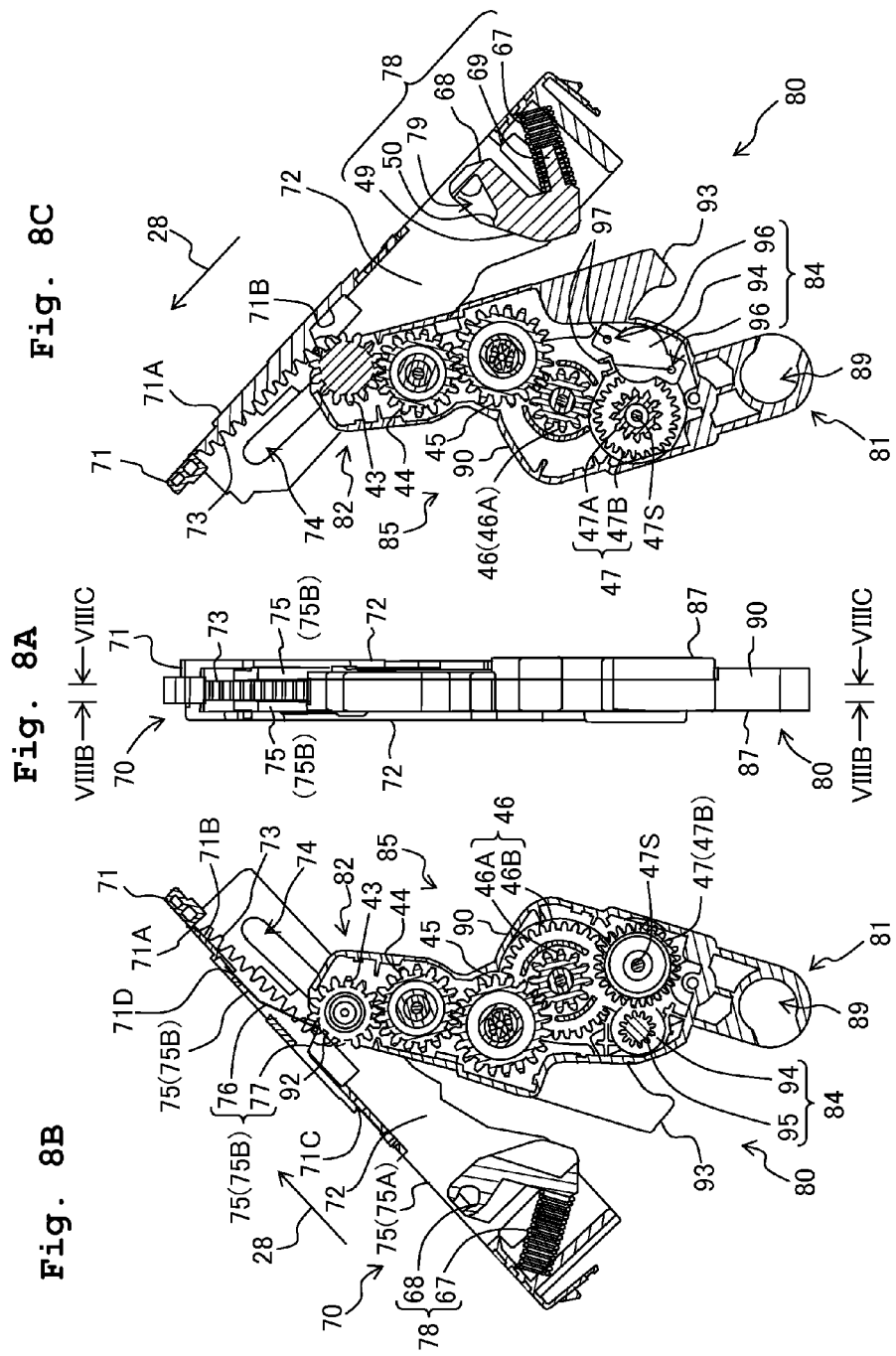

As depicted in FIGS. 5C and 7B, the gear 47B intermeshes with the damping gear 95 (see FIG. 7B) under a condition that the gear shaft 47S of the gear 47 is located on the side of the other end portion of the grooves 99 (the side near to the rotary damper 84). The position of the gear 47 in the state depicted in FIGS. 5C and 7B is the intermeshing position of the present teaching. On the other hand, the gear 47B is separated away from the damping gear 95 (see FIG. 8B) under a condition that the gear shaft 47S of the gear 47 is located on the side of the one end portion of the grooves 99 (the side away from the rotary damper 84). The position of the gear 47 in the state depicted in FIG. 8B is the separate position of the present teaching.

When the gear 47 is located at the intermeshing position, the damping force received by the damping gear 95 from the rotary damper 84 is transmitted to the gear 47. With this, the gear section 85 transmits the damping force from the damping gear 95 to the gear 47, then to the gear 46, then to the gear 45, then to gear 44, then to gear 43 and then to the rack gear 73, in this order.

On the other hand, when the gear 47 is located at the separate position, the damping force received by the damping gear 95 from the rotary damper 84 is not transmitted to the gear 47. Namely, the gear section 85 releases the transmission of the damping force from the damping gear 95 to the rack gear 73.

<Opening/Closing Operation of Scanner Housing 51 with Respect to Printer Housing 52>

In the following, a description will be given about an operation for closing the scanner housing 51 with respect to the printer housing 52. Namely, the operation for pivoting the scanner housing 51 from the open position to the close position will be described.

When the scanner housing 51 is located at the open position as depicted in FIG. 9, the gear shaft 43S of the gear 43 is located at an upstream end portion, of the elongated hole 74 of the rack member 70, in the radial direction 28 as depicted in FIG. 6. Further, when the scanner housing 51 is located at the open position, the projection 92 of the arm body 80 is engaged with the second inclined portion 77 of the leaf spring 75 as depicted in FIG. 7B. With this, the scanner housing 51 is maintained at the open position.

When the force is applied to the scanner housing 51 to pivot from the open position to the close position, the second inclined portion 77 of the leaf spring 75 presses the projection 92. With this, the second inclined portion 77 receives the reaction force from the projection 92. Then, the second inclined portion 77 and the first inclined portion 76 are moved toward the upper plate 71 of the rack member 70. Namely, the first and second inclined portions 76 and 77 are elastically deformed (elastically displaced). As a result, the engagement of the projection 92 with the second inclined portion 77 is released, which in turn makes the scanner housing 51 be movable from the open position to the close position. In the above-described manner, the leaf spring 75 is elastically deformable in a direction to release the engagement with the projection 92.

When the scanner housing 51 pivots from the open position toward the close position in the direction indicated by an arrow 34 (see FIG. 9), the gear shaft 43S of the gear 43 slidably moves in the elongated hole 74 in the radial direction 28, as depicted in FIG. 6. Also in this situation, the gear 43 rotates counterclockwise in FIG. 9 while slidably moving in the radial direction 28 with respect to the rack gear 73. In FIG. 9, the counterclockwise rotation of the gear 43 causes the gear 44 to rotate clockwise, which in turn causes the gear 45 to rotate counterclockwise, and which in turn causes the gear 46 to rotate clockwise.

In FIG. 9, when the gear 46 rotates clockwise, the gear 47 orbits (turns) clockwise around the gear shaft 46S of the gear 46, while rotating counterclockwise on the gear shaft 47S. In FIG. 9, the clockwise turning of the gear 47 around the gear shaft 46S causes the gear shaft 47S of the gear 47 to move along the groove 99 in a direction approaching toward the rotary damper 84. With this, the gear 47 moves to the intermeshing position depicted in FIGS. 7B and 7C and intermeshes with the damping gear 95 adjacent to the gear 47. Then, in FIG. 9, the damping gear 95 rotates clockwise due to the counterclockwise rotation of the gear 47. With this, the damping gear 95 receives the damping force generated by the friction between the rotor and the viscous fluid in the rotary damper 84.

Then, the damping force is transmitted to the rack gear 73 via the damping gear 95 and the gear section 85. Namely, when the scanner housing 51 pivots from the open position toward the close position, the gear section 85 transmits the damping force from the damping gear 95 to the rack gear 73. As a result, the scanner housing 51 receives the load from the rotary damper 84 when the scanner housing 51 pivots in the direction indicated by the arrow 34.

Figure 10:
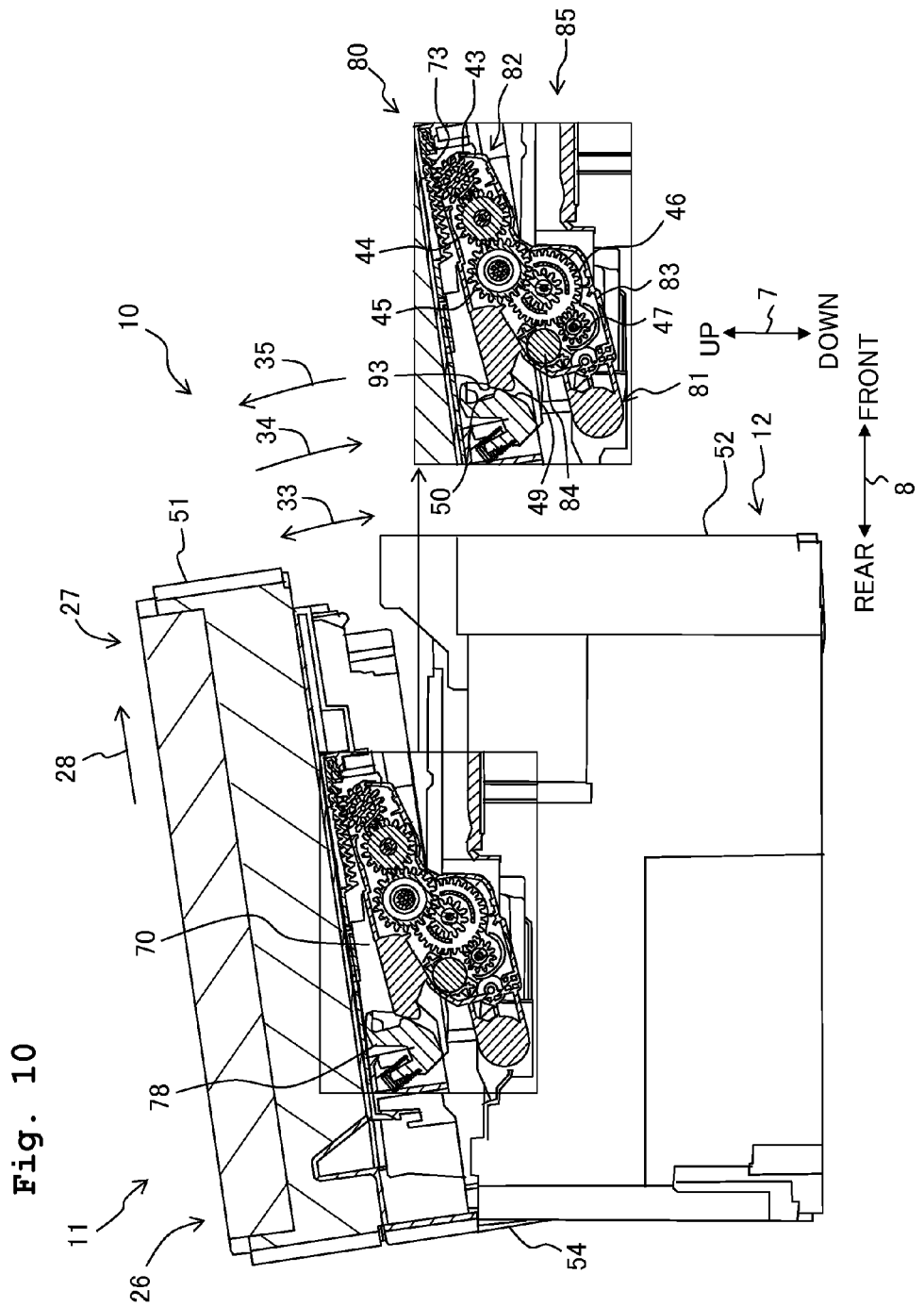
FIG. 10 is a cross-sectional view corresponding to FIG. 9 in a state that the scanner housing is located between the open position and the close position.

Further, when the scanner housing 51 reaches to a position near to the close position and depicted in FIG. 10, the projection 93 is brought into contact with an inclined surface 49 of the contact member 68 in the actuator mechanism 78, thereby pressing the contact piece 68. With this, the contact member 68 is moved in a direction opposite to the radial direction 28, against the urging force of the coil spring 67. In this situation, while the projection 93 is applying the force to the contact member 68, the projection 93 receives the reaction force from the contact member 68. With this, the scanner housing 51 receives the load from the actuator mechanism 78, in addition to the load from the rotary damper 84 as described above, when the scanner housing 51 pivots in the direction indicated by the arrow 34.

When the scanner housing 51 pivots from the position depicted in FIG. 10 further in the direction indicated by the arrow 34, the projection 93 is fitted in the recessed portion 79 provided on the contact member 68. With this, the contact member 68 is not pressed by the projection 93, and thus the contact member 68 returns, due to the urging force of the coil spring 67, to the position before having been pressed by the projection 93. As a result, the projection 93 is engaged with the actuator mechanism 78. At this time, the scanner housing 51 reaches to a position depicted in FIG. 11. The scanner housing 51 in the state depicted in FIG. 11 is located at the close position.

Next, a description will be given about an operation for opening the scanner housing 51 with respect to the printer housing 52. Namely, the operation for pivoting the scanner housing 51 from the close position to the open position will be described.

When the scanner housing 51 is located at the close position as depicted in FIG. 11, the gear shaft 43S of the gear 43 is located at a downstream end portion, of the elongated hole 74 of the rack member 70, in the radial direction 28 as depicted in FIG. 5A.

When the force for pivoting the scanner housing 51 from the close position toward the open position is applied to the scanner housing 51, an inclined surface 50 of the contact member 68 in the actuator mechanism 78 presses the projection 93, as depicted in FIG. 11. With this, the contact member 68 receives the reaction force from the projection 93. Then, the contact member 68 moves in the direction opposite to the radial direction 28 against the urging force of the coil spring 67. Namely, the actuator mechanism 78 is elastically deformed (elastically displaced). As a result, the engagement between the projection 93 and the contact member 68 is released, thereby making the scanner housing 51 be movable from the close position to the open position. In such a manner described above, the actuator mechanism 78 is elastically deformable in a direction for releasing the engagement with the projection 93.

When the scanner housing 51 pivots from the close position toward the open position in the direction indicated by the arrow 35 (see FIG. 10), the gear shaft 43S of the gear 43 slidably moves in the elongated hole 74 in the direction opposite to the vector radius direction 28 as depicted in FIG. 5A. Further, in this situation, the gear 43 rotates clockwise in FIG. 11 while slidably moving with respect to the rack gear 73 in the direction opposite to the vector radius direction 28. In FIG. 11, the clockwise rotation of the gear 43 causes the gear 44 to rotate counterclockwise, which in turn causes the gear 45 to rotate clockwise, and which in turn causes the gear 46 to rotate counterclockwise.

In FIG. 11, the counterclockwise rotation of the gear 46 causes the gear 47 to rotate clockwise while orbiting (turning) counterclockwise around the gear shaft 46S of the gear 46. In FIG. 11, the counterclockwise turning of the gear 47 around the gear shaft 46S causes the gear shaft 47S of the gear 47 to move along the grooves 99 in a direction separating away from the rotary damper 84. With this, the gear 47 moves to the separate position depicted in FIGS. 8B and 8C, and is separated away from the damping gear 95 adjacent to the gear 47. Accordingly, even when the gear 47 rotates clockwise, the damping gear 95 does not rotate. Consequently, the damping gear 95 does not receive the damping force generated by the friction between the rotor and the viscous fluid in the rotary damper 84. Namely, when the scanner housing 51 pivots from the close position toward the open position, the gear section 85 releases the transmission of the damping force from the damping gear 95 to the rack gear 73. As a result, the scanner housing 51 does not receive any load from the rotary damper 84 when the scanner housing 51 pivots in the direction indicated by the arrow 35.

In the process that the scanner housing 51 pivots in the direction indicated by the arrow 35, the projection 92 moves along the leaf spring 75 while contacting with the leaf spring 75. Further, when the scanner housing 51 reaches a position near to the open position, the projection 92 (see FIG. 7B) presses the first inclined portion 76 of the leaf spring 75. With this, the first inclined portion 76 and the second inclined portion 77 move toward the upper plate 71 of the rack member 70. As a result, the projection 92 passes through the first inclined portion 76 and engages with the second inclined portion 77, and the scanner housing 51 reaches the open position.

<Effect of Embodiment>

According to the embodiment, the gear section 85 and the rotary damper 84 are accommodated in the arm body 80. Thus, the accommodating space for the gear section 85 and the rotary damper 84 in the printer housing 52 and the accommodation space for the arm body 80 in the printer housing 52 can be made common, thereby making it possible to prevent the opening/closing apparatus from becoming large-sized.

Further, according to the embodiment, in a process that the scanner housing 51 pivots from the open position toward the close position, the damping force is transmitted from the damping gear 95 to the rack gear 73 by the transmission switching section, thereby imparting the load from the rotary damper 84 to the scanner housing 51 during the pivot motion thereof. As a result, the pivot speed of the scanner housing 51 can be made small during the pivot motion of the scanner housing 51 from the open position toward the close position. On the other hand, in a process that the scanner housing 51 pivots from the close position toward the open position, the transmission of damping force from the damping gear 95 to the rack gear 73 is released by the transmission switching section, thereby imparting no load from the rotary damper 84 to the scanner housing 51 during the pivot motion of the scanner housing 51. As a result, the pivot motion of the scanner housing 51 from the close position toward the open position can be executed smoothly.

Furthermore, according to the embodiment, the function of the transmission switching section can be realized with a simple configuration that is the planet gear.

Moreover, according to the embodiment, the other end portion 82 of the arm body 80 slidably moves relative to the scanner housing 51 in the radial direction 28 when the scanner housing 51 pivots toward the close position. With this, the other end portion 82 of the arm body 80 is distant from the pivot base end portion of the scanner housing 51. As a result, the load received by the other end portion 82 of the arm body 80 from the scanner housing 51 during the pivot motion of the scanner housing 51 toward the close position can be made small, thereby making it possible to lower the possibility of any damage to the scanner housing 51.

According to this configuration, the gear 46 is arranged in a state that the gear 46A having a small diameter among the plurality of gears constructing the gear 46 intermeshes with the gear 45 on the side of the rack gear 73, and the gear 46B having a large diameter among the plurality of gears constructing the gear 46 intermeshes with the gear 47A on the side of the damping gear 95. With this, the force in the tangential direction at a same torque, imparted to the damping gear 95 from the gear 47B intermeshing with the damping gear 95, can be made small. As a result, any breakage of the damping gear 95, which would be otherwise caused due to the excessive force imparted to the damping gear 95 having the small diameter, can be suppressed. Namely, it is possible to use a small-sized rotary damper 84 provided with the damping gear 95 having the small diameter. That is, the rotary damper 84 accommodated in the arm body 80 can be made small, thereby making it possible to realize a small-sized arm body 80. Note that according to this configuration, the force in the tangential direction is further made small by arranging the gear 47 in a similar manner as the gear 46.

Further, according to this configuration, the tangential velocity of the gear 47B intermeshing with the damping gear 95 can be made high by arranging the gears 46 and 47 in the states as described above. Accordingly, the damping gear 95 rotates at a high speed, thereby making it possible to generate the damping force from the viscous fluid appropriately, namely to operate the rotary damper 84 appropriately.

According to the embodiment, the rotary damper 84 that is larger in the left/right direction 9 than the gears 43 to 47 constructing the gear section 85 is arranged at a portion on the side of the one end portion 81 of the arm body 80. With this, a portion on the side of the other end portion 82 of the arm body 80 can be made smaller than that on the side of the one end portion 81 of the arm body 80. Here, the side on the one end portion 81 of the arm body 80 means the side of the pivot base end portion of the arm body 80, and the side on the other end portion 82 of the arm body 80 means the side of the pivot front-end portion of the arm body 80. Namely, in this embodiment, it is possible to suppress the space required for the pivot motion of the arm body 80 to be small by decreasing an area or portion on the side of the pivot front-end portion, of the arm body 80, which requires a space for the pivot motion of the arm body 80 that is larger than that on the side of the pivot base end of the arm body 80.

According to the embodiment, the rack gear 73 is provided in the recessed portion 55, thus making it possible to lower any possibility that the rack gear 73 might come into contact with a hand, etc. of an user or repair service person.

According to the embodiment, the scanner housing 51 can be maintained at the open position by engaging the projection 92 with the leaf spring 75.

According to the embodiment, in a case that the projection 93 engages with the actuator mechanism 78 in a process that the scanner housing 51 pivots from the open position toward the close portion, the load generated from the elastic deformation of the actuator mechanism 78 is imparted to the scanner housing 51 during the pivot motion thereof. With this, the pivot speed of the scanner housing 51 can be made small during the pivot motion thereof from the open position toward the close position.

[Modifications]

Although in the embodiment, the leaf spring 75 is provided in the rack member 70 and the projection 92 is provided on the arm body 80, it is allowable that, in a manner contrary to that in the embodiment, the projection 92 is provided in the rack member 70 and that the leaf spring 75 is provided on the arm body 80.

Further, in the embodiment, the actuator mechanism 78 is provided in the rack member 70 and the projection 93 is provided on the arm body 80. It is allowable, however, that in a manner contrary to that in the embodiment, the projection 93 is provided in the rack member 70 and that the actuator mechanism 78 is provided on the arm body 80.

Further, the damping gear 95 may intermesh with a gear different from the gear 47 supported at the position nearest to the side of the one end portion 81 of the housing 83 in the arm body 80, namely, the damping gear 95 may intermesh with any one of the gears 43 to 46.

Further, the number of the gears constructing the gear section 85 is not limited to five. For example, the gear section 85 may be constructed of one gear only. In such a case, the one gear intermeshes with both of the rack gear 73 and the damping gear 95.

Further, in the embodiment, the gear 47 is the planet gear. It is allowable, however, that any one of the remaining gears 43 to 46 constructing the gear section 85 may be a planet gear. For example, the gear 45 may be a planet gear of which sun gear is the gear 44.

Further, in the embodiment, an example of the transmission switching section of the present teaching is the gear 47 which is a planet gear. However, the transmission switching section of the present teaching is not limited to the planet gear. For example, any one of the gears 43 to 47 constructing the gear section 85 or the damping gear 95 of the rotary damper 84 may be provided with a known one-way clutch mechanism. In such a case, the gear provided with the one-way clutch mechanism transmits the driving force to another gear intermeshing with the gear, during the rotation accompanying with the pivot motion of the scanner housing 51 from the open position to the close position, but the gear does not transmit the driving force to the another gear intermeshing with the gear, during the rotation accompanying with the pivot motion of the scanner housing 51 from the close position to the open position.

Furthermore, it is allowable that the opening/closing apparatus is not provided with the transmission switching section of the present teaching. In such a case, the scanner housing 51 receives the load from the rotary damper 84 in both cases that the scanner housing 51 pivots from the open position to the close position and that the scanner housing 51 pivots from the close position to the open position.

Moreover, the opening/closing apparatus may be provided for an apparatus different from the multifunction peripheral 10. For example, the opening/closing apparatus may be provided for the hood of an automobile.

What is claimed is:

1. An opening/closing apparatus comprising:
   an apparatus body;
   a pivot body provided with a pivot base end portion including a pivot center around which the pivot body pivots relative to the apparatus body, and a pivot front-end portion of which pivot motion amount is greatest in a case that the pivot body pivots relative to the apparatus body, the pivot body being pivotable relative to the apparatus body between a close position at which an upper portion of the apparatus body is covered by the pivot body and an open position at which the upper portion of the apparatus body is released;
   a rack member provided on the pivot body and having a rack gear extending in a radial direction from the pivot base end portion to the pivot front-end portion; and
   an arm body having one end portion connected to the apparatus body and the other end portion connected to the rack member and configured to slide relative to the rack member,
   wherein the arm body includes:
   a housing;
   a rotary damper supported by the housing and having a damping gear configured to receive damping force from viscous fluid; and
   a gear section supported by the housing and configured to transmit the damping force of the damping gear to the rack gear, wherein the gear section includes a transmission switching section configured to release transmission of the damping force from the damping gear to the rack gear under a condition that the pivot body pivots from the close position toward the open position, and to transmit the damping force from the damping gear to the rack gear under a condition that the pivot body pivots from the open position toward the close position.

2. The opening/closing apparatus according to claim 1, wherein the gear section includes at least a sliding gear intermeshing with the rack gear, and a planet gear, the transmission switching section is the planet gear, and the planet gear is located in an intermeshing position at which the planet gear intermeshes with an adjacent gear adjacent to the planet gear under the condition that the pivot body pivots from the open position toward the close positon, and is located at a separate position at which the planet gear is separated away from the adjacent gear under the condition that the pivot body pivots from the close position toward the open positon.

3. The opening/closing apparatus according to claim 2, wherein the housing of the arm body has an opening formed on a side of the other end portion thereof,
   the sliding gear is partially protruded from the opening of the housing,
   the rack member further includes an elongated hole elongated in a direction parallel to an extending direction of the rack gear,
   the rotary shaft of the sliding gear slides in the elongated hole in the radial direction under the condition that the pivot body pivots from the open position toward the close position, and
   the rotary shaft of the sliding gear slides in the elongated hole in an opposite direction opposite to the radial direction under the condition that the pivot body pivots from the close position toward the open position.

4. The opening/closing apparatus according to claim 1, wherein the gear section includes a multistage gear constructed of a plurality of gears aligned in a thrust direction, configured to rotate integrally and having mutually different radii.

5. The opening/closing apparatus according to claim 1, wherein the pivot body includes a recessed portion formed on a side of the apparatus body, and
   the rack member is provided in the recessed portion.

6. The opening/closing apparatus according to claim 1, further comprising:
   an open-engaging portion provided for the housing of the arm body at a position on a side of the other end portion; and
   an open-engaged portion provided for the rack member and configured to be engaged with the open-engaging portion in a state that the pivot body is located at the open position;
   wherein one of the open-engaging portion and the open-engaged portion is elastically deformable in a direction releasing engagement with the other of the open-engaging portion and the open-engaged portion.

7. The opening/closing apparatus according to claim 1, further comprising:
   a close-engaging portion provided for the housing of the arm body at a position on a side not facing the apparatus body; and
   a close-engaged portion provided for the rack member and configured to be engaged with the close-engaging portion in a state that the pivot body is located at the close position,
   wherein one of the close-engaging portion and the close-engaged portion is displaceable in a direction releasing engagement with the other of the close-engaging portion and the close-engaged portion.

8. An image recording apparatus comprising:
   the opening/closing apparatus as defined in claim 1; and
   a recording unit provided for the apparatus body and configured to record an image on a recording medium.

9. An opening/closing apparatus comprising:

an apparatus body;

a pivot body provided with a pivot base end portion including a pivot center around which the pivot body pivots relative to the apparatus body, and a pivot front-end portion of which pivot motion amount is greatest in a case that the pivot body pivots relative to the apparatus body, the pivot body being pivotable relative to the apparatus body between a close position at which an upper portion of the apparatus body is covered by the pivot body and an open position at which the upper portion of the apparatus body is released;

a rack member provided on the pivot body and having a rack gear extending in a radial direction from the pivot base end portion to the pivot front-end portion; and an arm body having one end portion connected to the apparatus body and the other end portion connected to the rack member and configured to slide relative to the rack member, wherein the arm body includes:

a housing;

a rotary damper supported by he housing and having ear configured to receive damping force from viscous fluid; and a gear section supported by the housing and configured to transmit the damping force of the damping gear to the rack gear, wherein the damping gear intermeshes with a gear which is supported at a position nearest to the one end portion of the housing of the arm body.

10. The opening/closing apparatus according to claim 9, wherein the gear section includes a transmission switching section configured to release transmission of the damping force from the damping gear to the rack gear under a condition that the pivot body pivots from the close position toward the open position, and to transmit the damping force from the damping gear to the rack gear under a condition that the pivot body pivots from the open position toward the close position.

* * * * *